United States Patent [19]

Majewicz

[11] 4,306,061

[45] Dec. 15, 1981

[54] PREPARATION OF CMC WITH IMPROVED SUBSTITUENT UNIFORMITY USING BORAX

[75] Inventor: Thomas G. Majewicz, Chadds Ford, Pa.

[73] Assignee: Hercules Incorporated, Wilmington, Del.

[21] Appl. No.: 220,940

[22] Filed: Dec. 29, 1980

[51] Int. Cl.³ ............................ C08B 1/06; C08B 1/08; C08B 11/08
[52] U.S. Cl. ........................................ 536/98; 536/97; 536/101
[58] Field of Search ............................ 536/97, 98, 101

[56] References Cited

U.S. PATENT DOCUMENTS 4,001,210  1/1977  Engelskirchen et al. ...... 260/231 A

FOREIGN PATENT DOCUMENTS 2535311  8/1975  Fed. Rep. of Germany .
497671  12/1938  United Kingdom .

OTHER PUBLICATIONS

Encyclopedia of Polymer Science and Technology, vol. 3, John Wiley & Sons, Inc., pp. 520–539.

Primary Examiner—Ronald W. Griffin
Attorney, Agent, or Firm—William S. Alexander

[57] ABSTRACT

Solution qualities of carboxymethyl cellulose are improved by preparing the same with cellulose which has been alkalized in the presence of a borate ion-containing salt.

3 Claims, No Drawings

PREPARATION OF CMC WITH IMPROVED SUBSTITUENT UNIFORMITY USING BORAX

This invention relates to an improved process for preparing carboxymethyl cellulose (CMC).

CMC is a widely used water-soluble derivative of cellulose which finds application in many industrial and domestic uses as a thickener in aqueous systems. One such system in which CMC is favored for its viscosifying power and also for its utility as a water loss preventive is in drilling muds for use in oil well drilling.

The optimum product for drilling muds and for most uses is a product having a high degree of carboxymethyl substitution so that it is highly soluble and having a high molecular weight so that it produces a high viscosity solution when dissolved in water. When used as a thickener in fresh water systems, the high molecular weight products perform very well, but when the intended application requires the use of salt water, as frequently happens, particularly in the case of drilling muds, they do not perform well at all. There is a marked decrease in solubility and solution quality of high molecular weight CMC in salt water as compared to fresh water, resulting in only partial dissolution of the polymer and turbid, structured solutions of low viscosity.

It is the object of this invention to provide a process for preparing carboxymethyl cellulose which exhibits good solution properties in salt water.

CMC is prepared by a well-known process wherein a cellulose furnish is treated with sodium or other alkali metal hydroxide to make alkali cellulose which, in turn, is reacted with sodium monochloroacetate. The reaction is usually carried out in the presence of an inert organic diluent such as a lower aliphatic alcohol or ketone. Preferred diluents are isopropanol and acetone.

In accordance with this invention it has been found that the solution properties of CMC in salt solutions are significantly improved if the carboxymethylation reaction is carried out using an alkali cellulose which has been prepared in the presence of a borate ion-containing salt. More precisely, the invention is an improvement in the method of preparing carboxymethyl cellulose wherein cellulose is steeped in an alkali metal hydroxide to prepare alkali cellulose and thereafter reacted with sodium monochloroacetate to convert said alkali cellulose to carboxymethyl cellulose, which improvement comprises carrying out the alkali cellulose preparation in the presence of about 1.5 to 20% by weight, based on the weight of cellulose, of a borate ion-containing salt. The preferred range of borate is about 3 to 10%.

The boric acid salts which can be used are any of the salts of orthoboric acid, i.e., those which ionize to form borate ions. These include any of the alkali metal borates such as potassium or sodium orthoborate and the various hydrates thereof. The most common borate and a preferred material to use is sodium tetraborate decahydrate, also known as borax.

The method of the invention is useful with either type of cellulose furnish commonly used, i.e., wood pulp or cotton linters (chemical cotton). Cotton linters are used as the furnish for producing high molecular weight products. The improvements to be gained via the invention are more dramatic with the higher molecular weight cotton linters furnish which is more crystalline than wood pulp and as a result is more difficult to carboxymethylate uniformly. Non-uniform substitution contributes greatly to poor solution quality, both in salt water and fresh water, but to a greater extent in salt water. The lower crystallinity and lower molecular weight of wood pulp permit somewhat more uniform substitution so that solution quality is generally better. Improvements in these products are noticeable more in the appearance of the solution than in its viscosity.

The method of the invention is likewise helpful with either of the two diluents most commonly employed in carboxymethylating cellulose, namely, isopropanol (IPA) and acetone. Isopropanol is generally regarded as the better diluent, leading to generally smoother and higher viscosity solutions in the prior art process than does acetone. The benefits of the invention are observable with both diluents, but the superiority of isopropanol is still apparent in the solution properties of the products.

The benefits of the invention are generally most noticeable with CMC within the D.S. range of about 0.6 to 1.2. Below this level the amount of substitution is so little that, even with the improved substitution uniformity imparted by the use of the borate ion-containing material, solution quality is not good. This material is employed only in applications where solution quality is not important. Above a D.S. of about 1.2, the amount of carboxymethyl functionality is such that sufficient uniformity is effected in the conventional process to afford good solution properties without the use of borate ion.

One of the applications in which CMC finds wide usage is as a thickener in drilling mud for use in oil well drilling. Such muds are frequently prepared at the drilling site where fresh water may not always be available. In such cases solubility in salt solutions can be very important and the process of this invention makes salt soluble CMC available for this application.

Surprisingly, and unpredictably, CMC prepared according to the method of the invention also exhibits a second improved property of value to drilling muds; namely, it substantially decreases the water loss potential of such a mud. Water loss is defined as the loss of water from a drilling mud to the oil well formation. The greater the water loss value of a mud, the greater is the potential of losing water from the mud to the formation during drilling. Thus, low water values are desirable. A saturated salt water drilling mud thickened with conventionally prepared CMC, from cotton linters furnish, exhibits water loss values of about 25 to 40 for CMC prepared in IPA and 40–140 for CMC prepared in acetone. The same drilling mud thickened with CMC prepared by the process of this invention exhibits water loss values of about 20 to 25 for CMC prepared in IPA and 20–40 for CMC prepared in acetone.

The following examples exemplify, but do not limit the invention. Parts and percentages are by weight, unless otherwise specified.

EXAMPLE 1

A. Preparation of CMC

About 475 parts acetone was added to 32.4 (bone dry basis) parts fine cut cotton linters in a stirred autoclave reactor bowl. The bowl containing this slurry was degassed by evacuating to 0.0625 kg ./sq. cm. absolute pressure and holding this vacuum for one minute, then repressuring to 1.4 kg./sq. cm. gage pressure with nitrogen. This cycle was repeated four times.

A solution of 23.5 parts sodium hydroxide and 2.9 parts borax in 55 parts water was added while the reactor was still under vacuum. The alkali cellulose mixture was stirred for about one hour at 15° to 25° C. under a nitrogen blanket at 0.703 kg./sq. cm. gate pressure.

The reactor was evacuated and 26.2 parts reagent grade monochloroacetic acid in 20 parts acetone was added. The reactor was pressurized to 0.703 kg./sq. cm. with nitrogen and the slurry was heated to 85° C. over a 45-minute period and maintained at that temperature for two hours.

Upon cooling to room temperature, the slurry was neutralized with acetic acid, filtered, washed 2 times with 55% acetone, filtered again, dehydrated with acetone and dried. The D.S. was determined to be 0.9. A control run was also carried out, following substantially the same procedure except that the borax was not used. The D.S. was determined to be the same.

The viscosity of 1% solutions of the two CMC specimens was determined in various aqueous media at 25° C. using a Brookfield viscometer, with #3 spindle at 30 r.p.m. Results are as follows:

|  | Plain H$_2$O | 2% KCl | 2% NaCl/ 0.2% CaCl$_2$ | Saturated NaCl |
|---|---|---|---|---|
| Control | 8080 cps. | 6880 | 4920 | 1128 |
| Example 1 | 7120 cps. | 5900 | 7300 | 3460 |

The saturated salt solution of the control was much hazier than the saturated salt solution of the CMC of Example 1.

EXAMPLE 2

About 314 parts isopropanol was added to 32.4 parts (bone dry basis) fine cut cotton linters in a reactor. The slurry was agitated and sparged with nitrogen for 30 minutes. A solution of 23.5 parts sodium hydroxide and 2.9 parts borax in 52 parts water was added and/the alkali cellulose slurry was agitated for 1 hour with a continuous nitrogen sparge throughout. A solution of 26.2 parts monochloroacetic acid in 25 parts isopropanol was added and the slurry heated to 70° C. over a 30-minute period. Reaction was allowed to continue for 90 minutes. After cooling and neutralization with acetic acid, the product was washed with 80% methanol, then dehydrated with 99% methanol and dried. The D.S. was 0.9.

A control run was carried out, omitting the borax, the D.S. being the same.

Viscosity data for the two CMC specimens are as follows:

|  | Plain H$_2$O | 2% KCl | 2% NaCl/ 0.2% CaCl$_2$ | Saturated NaCl |
|---|---|---|---|---|
| Control | 7160 cps. | 7720 | 6680 | 6520 |
| Example 2 | 7300 cps. | 7160 | 6960 | 10,000 |

The saturated salt solution of the control was noticeably hazier than that of Example 2.

EXAMPLE 3

The procedure set forth in Example 2 was repeated using 20.4 parts sodium monochloroacetate to produce a CMC having a D.S. of about 0.7. Four runs were made using, respectively, 0%, 3%, 9% and 20% borax, based on the weight of the cotton linters furnish. Viscosity data for the four specimens are as follows:

| Borax Con. | Plain H$_2$O | 2% KCl | 2% NaCl/ 0.2% CaCl$_2$ | Saturated NaCl |
|---|---|---|---|---|
| 0 | 9420 | 7390 | 4980 | 282 |
| 3% | 7120 | 5780 | 6280 | 11,240 |
| 9% | 5780 | 4980 | 5620 | 8320 |
| 20% | 6860 | 5320 | 6280 | 10,100 |

The saturated salt solution of the control was hazier than that of any of the specimens prepared with borax.

EXAMPLE 4

Example 1 was repeated using wood pulp as the cellulose furnish. The viscosity of solutions of the resultant CMC was substantially the same when borax was used as it was when borax was not used. Solution clarity in saturated salt was substantially improved when borax was used. Viscosity data are as follows:

|  | Plain H$_2$O | 2% KCl | 2% NaCl/ 0.2% CaCl$_2$ | Saturated NaCl |
|---|---|---|---|---|
| Control | 1560 | 996 | 1204 | 2780 |
| Example 4 | 1564 | 1168 | 1584 | 2888 |

EXAMPLE 5

Example 3 was repeated using wood pulp as the cellulose furnish to prepare a CMC of 0.7 D.S. Again, the viscosity of solutions of CMC was substantially the same whether borax was used or not, but saturated salt solutions were less hazy.

|  | Plain H$_2$O | 2% KCl | 2% NaCl/ 0.2% CaCl$_2$ | Saturated NaCl |
|---|---|---|---|---|
| Control | 2000 | 1801 | 1152 | 1784 |
| Example 5 | 1932 | 1756 | 1056 | 1732 |

EXAMPLE 6

Using the procedure described in Example 1, a series of four carboxymethylation reactions were run as follows:

(a) Control using no borax.

(b) Control in which 10% borax was added following completion of the reaction but before neutralization.

(c) 1.5% borax added during alkali cellulose preparation.

(d) 10% borax added during alkali cellulose preparation.

Solution properties of the products are as follows:

|  | Viscosity | | Solution Appearance | |
|---|---|---|---|---|
|  | Plain H$_2$O | Sat NaCl | Plain H$_2$O | Sat NaCl |
| 6a | 10,800 | 280 | Clear - structured | Very hazy |
| 6b | 12,300 | 35 | Clear - structured | Very hazy |
| 6c | 10,300 | 100 | Clear - slightly structured | Very hazy |
| 6d | 6,460 | 2120 | Clear - smooth | Hazy |

These results show that the borax, when added before reaction with the monochloroacetic acid, effects overall improvement in solubility characteristics at 10% level, while at the lowest level, 1.5%, an improvement in solution quality is effected as compared to the control runs in which no borax is used.

What I claim and desire to protect by Letters Patent is:

1. In the process of preparing carboxymethyl cellulose wherein cellulose is stepped in an alkali metal hydroxide to prepare alkali cellulose and thereafter reacted with sodium monochloroacetate to convert said alkali cellulose to carboxymethyl cellulose, the improvement which comprises carrying out the alkali cellulose preparation in the presence of about 1.5 to 20% by weight, based on the weight of cellulose, of a borate ion-containing salt.

2. The method of claim 1 wherein the borate ion-containing salt is sodium tetraborate decahydrate.

3. The method according to claim 2 wherein the sodium tetraborate decahydrate is present in the amount of about 3 to 10% by weight.